UNITED STATES PATENT OFFICE.

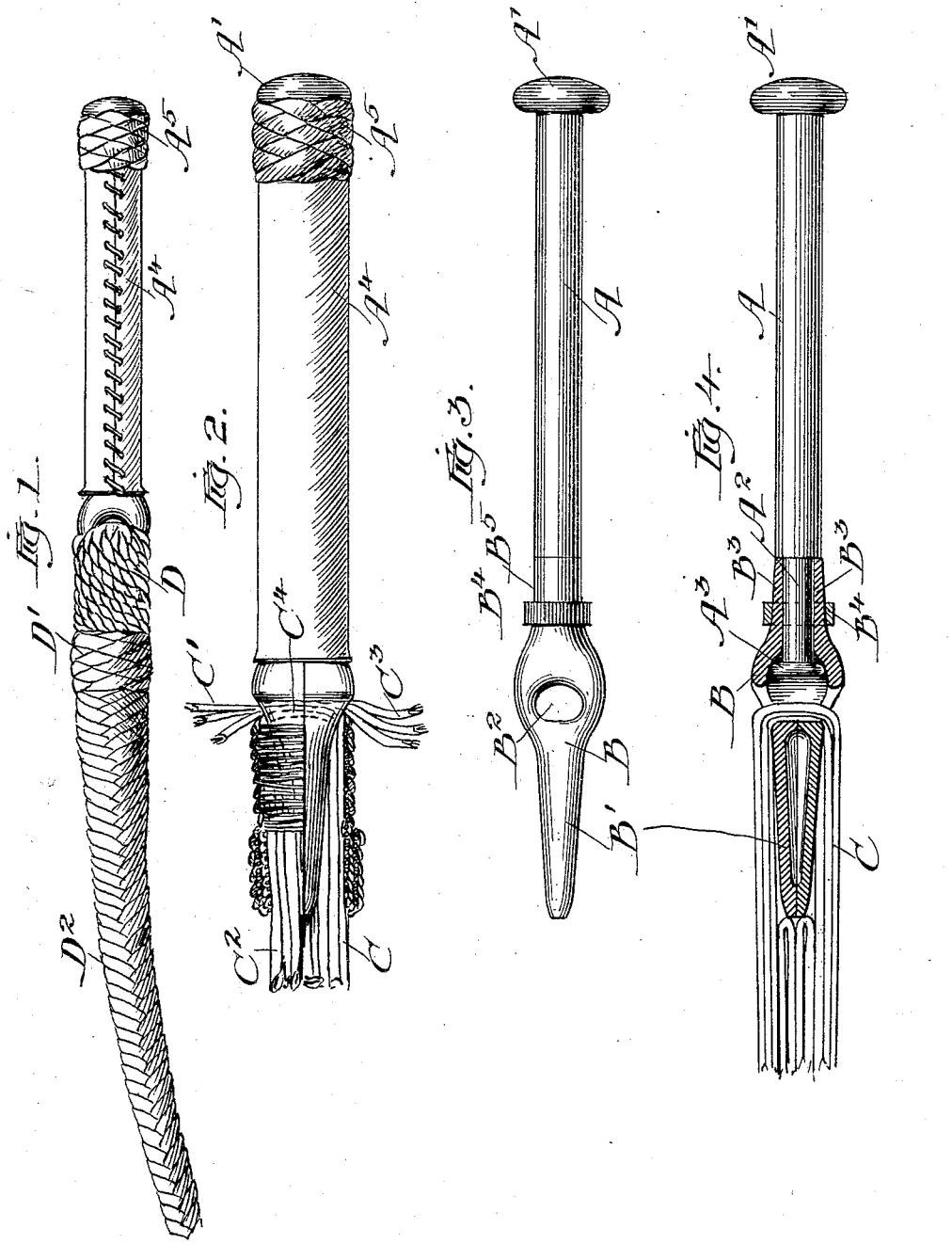

HENRY FLESCH, OF CHICAGO, ILLINOIS, ASSIGNOR TO DIAMOND WHIP COMPANY, OF CHICAGO, ILLINOIS, A CORPORATION OF ILLINOIS.

WHIP.

No. 931,047.   Specification of Letters Patent.   Patented Aug. 17, 1909.

Application filed February 8, 1909. Serial No. 476,729.

*To all whom it may concern:*

Be it known that I, HENRY FLESCH, a citizen of the United States, residing at Chicago, in the county of Cook and State of Illinois, have invented a certain new and useful Improvement in Whips, of which the following is a specification.

My invention relates to whips and has for its object to provide a rotary handle device.

It is illustrated in the accompanying drawings, wherein—

Figure 1 is a side elevation of a complete whip handle; Fig. 2 is a similar view with parts broken away; Fig. 3 is a side elevation of the interior of the handle core, and Fig. 4 is the same with parts of the whip applied and parts shown in section.

Like parts are indicated by the same letter in all the drawings.

A is the handle bar having at its outer end the head $A^1$ and at its inner end the reduced portion $A^2$ and head $A^3$.

$A^4$ is the handle cover and $A^5$ a thimble, preferably of leather, on the end of the handle covering near the head $A^1$.

B, B are rotary portions shaped as shown. Each preferably has a forwardly projecting reduced portion, the two together forming a pyramidal projection. Each has a hole $B^2$ and a reduced bearing portion $B^3$. When the parts are put together the bearing portion incloses the reduced portion $A^2$ of the handle and engages the head $A^3$. These two parts are held in this position by the band $B^4$ or wrapping $B^5$. When the metal portions are put together in the shape indicated in Fig. 3 the handle cover may be applied and also the thimble so as to finish the handle portion proper. The whip then is applied in any desired manner. I have suggested in the drawing how this can be done. The long portions of the leather C on one side are carried through the two holes $B^2$ $B^2$ until their ends $C^1$ project at the other side. In like manner the long portions $C^2$ on one side are carried through the holes until their ends $C^3$ project on the opposite side. There is usually an intermediate portion $C^4$ of leather not slitted. These several parts are then platted together in the usual manner so as to form the part D which incloses the pyramidal metal projection, the thimble $D^1$ near the end thereof and the projecting whip portion $D^2$.

It will be understood of course that I have not attempted to show exact proportions or sizes or relations of the several parts. Neither is there any importance to be attached to the particular manner of arranging the platting, or the ends of the strips, or to the cover of the handle, or the thimbles which give it a finished appearance. It will be seen that these as well as other features shown in my diagrammatic drawing can be greatly changed without departing from the spirit of my invention, but I have set up in the claims the things which are essential.

The use and operation of my invention will be obvious from what has already been described. The handle bar shaped as shown, with the two heads and if desired with the reduced portion, is preferably of one continuous piece of metal. The rotary portion is preferably of two pieces of metal adapted to be secured about the end of the handle bar but so as to rotate thereon and not be movable therealong. The handle cover and thimble are then put in position and the slitted leather or ends of the whip proper are carried in opposite directions through the apertures in the rotary portion and then the parts are platted down so as to form the covering for the rotary portion. This makes a complete whip, all the parts being securely held together and the whip proper being held rotatably on the handle.

I claim:

1. In a whip the combination of a handle bar having heads at both ends, with a rotatable hand portion secured on the bar between its heads, a rotatable lash portion secured on the bar, projecting beyond one head, having a transverse opening near such head, and a long tapering projection beyond the same, and a whip lash attached to such rotatable lash portion through the opening.

2. In a whip the combination of a handle bar having heads at both ends, with a rotatable hand portion secured on the bar between its heads, a rotatable lash portion secured on the bar, projecting beyond one head, having a transverse opening near such head, and a long tapering projection beyond the same, and a whip lash attached to such rotatable lash portion through the opening, said rotatable portion consisting of two parts, and a device for holding them together.

3. In a whip the combination of a handle bar having heads at both ends, with a rotatable hand portion secured on the bar between its heads, a rotatable lash portion secured on the bar, projecting beyond one head, having a transverse opening near such head, and a long tapering projection beyond the same, and a whip lash attached to such rotatable lash portion through the opening, said rotatable portion consisting of two parts, and a device for holding them together, consisting of a ring which slides upon the two parts and a handle cover which holds the ring in position.

4. In a whip the combination of a handle bar with a head, a rotatable lash portion inclosing said head, and having a long tapering projection beyond the same, a transverse opening near the head, and a lash secured to such rotating lash portion through the opening.

5. In a whip the combination of a handle bar with a head, a rotatable lash portion inclosing said head, and having a long tapering projection beyond the same, a transverse opening near the head and a lash secured to such rotating lash portion through the opening, said lash portion consisting of two parts secured together by means of a ring which incloses them.

HENRY FLESCH.

Witnesses:
   EDNA K. REYNOLDS,
   SOPHIE B. WERNER.